(12) United States Patent
Luo

(10) Patent No.: US 8,707,822 B2
(45) Date of Patent: Apr. 29, 2014

(54) ACTIVE ELECTRIC TORSIONAL VIBRATION DAMPER AND METHOD TO REALIZE THE SAME

(75) Inventor: Qing Luo, Shanghai (CN)

(73) Assignee: Qing Luo, Yangpu District, Shanghai (CN)

( * ) Notice: Subject to any disclaimer, the term of this patent is extended or adjusted under 35 U.S.C. 154(b) by 291 days.

(21) Appl. No.: 12/865,116

(22) PCT Filed: Feb. 5, 2010

(86) PCT No.: PCT/CN2010/070529
§ 371 (c)(1),
(2), (4) Date: Jul. 28, 2010

(87) PCT Pub. No.: WO2010/127568
PCT Pub. Date: Nov. 11, 2010

(65) Prior Publication Data
US 2011/0056787 A1    Mar. 10, 2011

(30) Foreign Application Priority Data
May 2, 2009 (CN) .......................... 2009 1 0050522

(51) Int. Cl.
*F16F 15/03* (2006.01)
(52) U.S. Cl.
USPC ........................ 74/574.1; 188/380; 188/267
(58) Field of Classification Search
USPC ......... 74/572.21, 574.1, 572.2; 188/267, 156, 188/157, 158, 161, 162, 266.3; 29/592.1; 301/6.91; 310/90, 50
See application file for complete search history.

(56) References Cited

U.S. PATENT DOCUMENTS

| | | | | |
|---|---|---|---|---|
| 5,468,055 | A * | 11/1995 | Simon et al. | 301/6.91 |
| 5,664,534 | A * | 9/1997 | Schmitz | 123/192.1 |
| 5,829,319 | A * | 11/1998 | Mokeddem | 74/574.1 |
| 6,209,692 | B1 * | 4/2001 | Pels et al. | 188/381 |
| 7,584,685 | B2 * | 9/2009 | Crist | 74/574.1 |
| 8,028,602 | B2 * | 10/2011 | Crist | 74/574.1 |
| 8,203,316 | B2 * | 6/2012 | Lemmers, Jr. | 322/4 |
| 2007/0144842 | A1 * | 6/2007 | Zhou | 188/267 |
| 2008/0110293 | A1 * | 5/2008 | Clausin | 74/574.1 |
| 2009/0183959 | A1 * | 7/2009 | Klit et al. | 188/267.1 |

* cited by examiner

*Primary Examiner* — Thomas Irvin
(74) *Attorney, Agent, or Firm* — Global IP Services; Tianhua Gu

(57) ABSTRACT

The present invention provides an active electric torsional vibration damper and a method to realize the same. The invention relates to the field of vibration reduction technology for rotating machinery. The damper comprises a fixed module, a relative rotating module, conducting coils, magnetic-field producing elements. The present invention can be used to produce transient anti-torsion which is same in frequency, opposite in direction and corresponding in amplitude to achieve the effect of eliminating torsional vibration on the original shaft system. The damper realizes a prominent effect of eliminating torsional vibration without complex measures.

5 Claims, 4 Drawing Sheets

ACTIVE ELECTRIC TORSIONAL VIBRATION DAMPER AND METHOD TO REALIZE THE SAME

CROSS REFERENCE TO RELATED PATENT APPLICATION

The present application is the US national stage of PCT/CN2010/070529 filed on Feb. 5, 2010, which claims the priority of the Chinese patent application No. 200910050522.1 filed on May 2, 2009, which application is incorporated herein by reference.

FIELD OF THE INVENTION

The present invention relates to the field of vibration reduction technology for rotating machinery.

BACKGROUND OF THE INVENTION

Torsional vibration is caused by periodic fluctuation generated by the torsion loads about its average value, commonly exists in devices of rotating machinery. Generally, the torsion and the vibration thereof have complex periodic characteristics which include the vibration from a series of frequency components such as cars, combustion engines on ships, drive systems of propeller shafts, and bump mechanisms, etc. If some frequency components of dynamic load tend to equal with the natural torsional frequency of a structure, the mechanism will be subjected from violent torsional resonances, which probably results in damage and failure of parts. Even a torsional vibration with small amplitude, which does not damage the equipment, it is still not allowed as it is harmful for the surrounding environment by the radiated vibration and noise.

Overall, the method to damp torsional vibration involves two kinds of matters: one is the method to deal with the device structure itself, the important aspect of which is to desynchronize the natural torsional frequency of a structure from the frequency of torsional load by designing vibration characteristics. Other is a function design, for instance, increasing number of cylinder for a combustion engine can even the torsional fluctuation and improve output power as well. However, increasing of the volume, weight will increase the manufacture cost and designing difficulties.

Other method is to design a special additional device to get a special function, typically such as the combination of flywheel and torsional vibration damper, and this kind of method has comparatively low cost and limited change for the main machinery.

Usually, the common torsional vibration dampers are passive and elastic damped, which utilize elastic element to isolate vibration in such a way that rubber or viscous fluid resists vibration and dissipates frictional heat transferred from kinetic and mechanical energy. In the principle of structure, flywheel is generally divided into two parts which are connected with each other by elastic element and may relatively move to an elastic range and between which high damping material is filled. The biggest disadvantage of the solution is that the damping apparatus with relative fixed system characteristics is apparently unable to meet the high requirements under the circumstances that the torsional frequency and amplitude endured rapidly change in a wide range. It is very important for modern rotating machines.

In addition to the passive mode structure as said above, the technology for semi-active one, the characteristic parameters of elastic element and damping element are vary real-time within a range when needed, is developed. However, the actual effect on torsional vibration reduction needs further observation.

Completely differing from two technology mentioned above, the present invention belongs to a method to eliminate vibration in active mode, which uses a control system to dynamically track multiple quantities of harmonics in torsional vibration, the frequency, the amplitude and the phase, to provide said electric torsional vibration damper with drive current, impels it to produce the transient torsion, equal in frequency, opposite in phase, corresponding in amplitude, then the effect of eliminating torsional vibration is achieved. The method takes the advantage of advanced technology of modern integrated circuit and effective control theory, realizes a prominent effect of eliminating torsional vibration and substantially decreases the requirements to change the device itself for reducing vibration.

SUMMARY OF THE INVENTION

The present invention aims to provide an active electric torsion damper and a method to realize the same. The damper produces an anti-torsion by electromagnetic excitation that is opposite to torsional-vibration direction of the shaft on a rotating machinery to eliminate the torsional vibration of the shaft.

An active electric torsional vibration damper comprises following devices:
a stationary device fixed on a shaft system rigidly;
a relative rotating device fixed on the shaft by spring elastically;
conducting coils fixed on either the stationary device or the relative rotating device; and
magnetic-field producing elements disposed on the stationary device without conducting coils or on the relative rotating device without conducting coils for producing an anti-vibration torsion by electromagnetic excitation.

Further, said damper comprises following technical features:
A brush is disposed on the shaft system to power said conducting coil.
Said stationary device has an X-shaped structure with four extended branches, an arc conducting-coil frame is disposed between two adjacent branches, while another arc conducting-coil frame is disposed between the opposite two adjacent branches.
At least one side of the conducting coil has the magnetic-field producing element to be disposed.
At least one space between two adjacent branches where no conducting coil is existed has a fixed block for limiting rotating range of the relative rotating device to be disposed therein.
The relative rotating device is fixed on the shaft system by two springs located symmetrically about the rotating shaft system.
The magnetic-field producing elements can create magnetic fields, which repel each other or attract each other, on said conducting coil.
A method to realize the active electric torsional vibration damper comprising following steps:
Step 1, assemble conducting coils on a stationary device and assemble magnetic-field producing elements on device relative rotating device at a position where is compatible with the conducting coils respectively;
Step 2, assemble the stationary device and the relative rotating device on a shaft system, where the stationary device is rigidly fixed and the relative rotating device is elastically fixed by springs;

Step 3, a control system is assembled to detect torsional vibration on the shaft system by sensors thereof;

Step 4, the control system powers the conducting coil to produce an anti-torsion that is equal to a torsion of the shaft system in frequency, amplitude but is opposite in direction to eliminate the torsional vibration of the shaft system.

Further, the fore-mentioned method comprises following technical features:

Said stationary device is consisted by a fixed structure having X shape with four extended branches, an arc conducting-coil frame is disposed between two adjacent branches, while another arc conducting-coil frame is disposed between the other two opposite branches.

The magnetic-field producing element is disposed at least on one side of the conducting coil.

The relative rotating device is fixed on the shaft system by two springs located symmetrically about the rotating shaft system.

The magnetic-field producing elements can create magnetic fields, which repel each other or attract each other, on said conducting coil.

The advantages of said active electric torsional vibration damper are:

1, the effect of vibration reduction can be achieved for a broad range of frequency;
2, on the principle of design, only pure torsion is provided, and neither additional radial force nor axial forces created on the shaft system;
3, great output torsion;
4, low damping; metal springs have a character of lower damping, so that the damper can produce an output torsion which is close to peak value;
5, rare-earth permanent magnet materials are easily obtained;
6, reliable performance, low requirement of environment, oil resistance and dirt resistance; the operating temperature is near 100° C.;
7, compact structure, the damper can be assembled on a flywheel vibration reduction device or other vibration reduction device;
8, vent holes can be disposed on the shaft system of said damper (or shaft system of flywheel if the damper is assembled with flywheel), air flow created by shaft system can cool the damper.

BRIEF DESCRIPTION OF THE DRAWINGS

Referencing with following drawings, the present invention is explained in more detail.

DETAIL DESCRIPTION OF THE INVENTION

Figure 1:
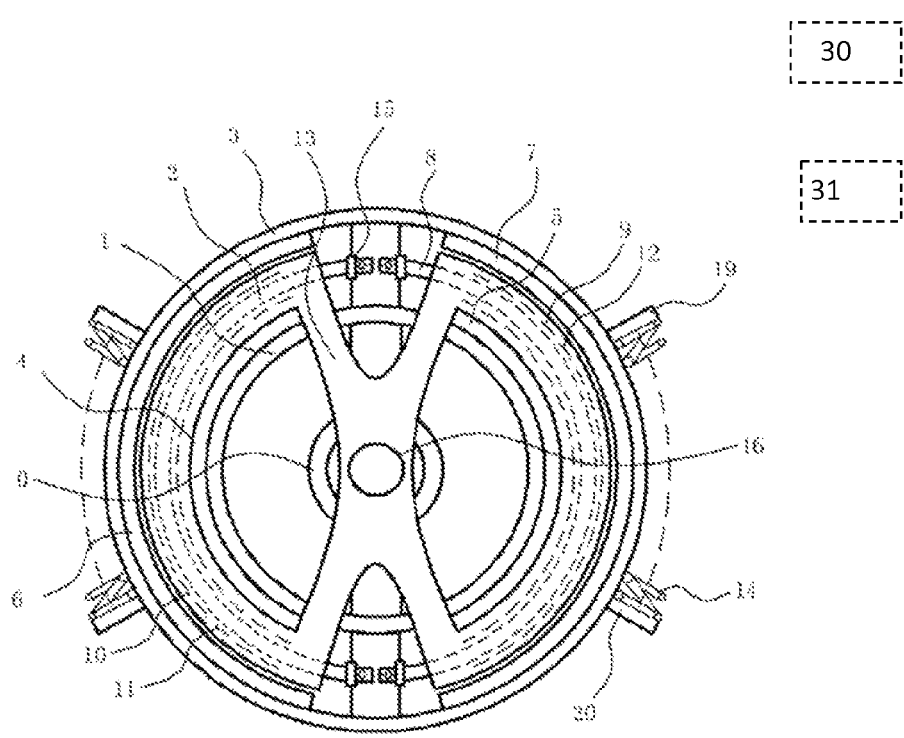
FIG. 1 is an illustrating view showing the structure of the active electric torsional vibration damper according to the present invention.
Figure 2:
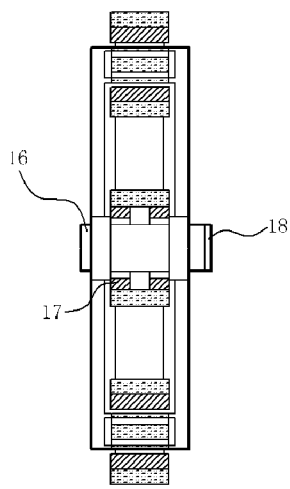
FIG. 2 is a side cross sectional view of the active electric torsional vibration damper according to the present invention.
Figure 3:
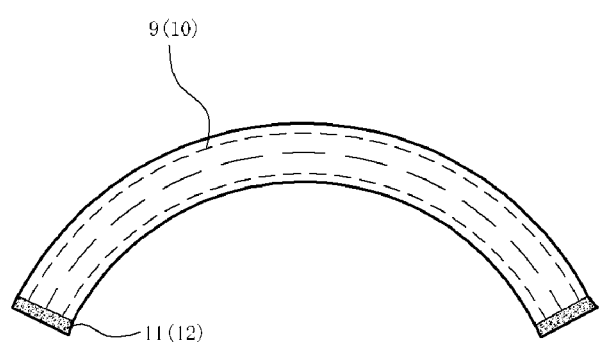
FIG. 3 is an illustrating view showing the structure of a conducting coil on the active electric torsional vibration damper according to the present invention.

Please refer to drawings, the invention discloses an active electric torsional vibration damper which mainly comprising a relative rotating device I and a stationary device II.

Said relative rotating device I and stationary device II are connected by a pair of springs 14, which results in a relative elastic rotation. The springs 14 are screw springs, which are not limited but typical. The relative rotating device I comprises a cored-ring 0, inner-ring 1, middle-ring 2, outer-ring 3, and ringed Neodymium Iron Boron magnets (NdFeB magnet) 4, 5, 6, 7. The cored-ring 0, the inner-ring 1, the middle-ring 2, the outer-ring 3 are fixed together by a pair of spoke bars 8 having an included angle of 180°.

In one embodiment the magnetic-field producing elements are ringed NdFeB magnets 4, 5, 6, 7 which belong to permanent magnet, in other embodiments the magnetic field can be created by electromagnetic induction, such as utilizing conducting coil to create magnetic field, etc.

The magnet 4 and magnet 5 are fixed outside the inner-ring 1 by binders or in other appropriate ways, and are symmetrically disposed about the spoke bars 8. Similarly, magnet 6 and magnet 7 are fixed inside the outer-ring 3 by binders or in other appropriate ways and symmetrically disposed about the spoke bars 8. Thus, magnet 4 and magnet 6, magnet 5 and magnet 7, are separated by middle-ring 2 and are oppositely disposed respectively, and the magnetic-field direction of the magnets is radial of the inner or outer rings.

On the structure mentioned above, magnetic-field producing elements are disposed on both sides of said conducting coils 11, 12. In other embodiment, an alone magnetic-field producing element can be disposed either inside or outside.

The stationary device II comprises a pair of ringed frames 9, 10, conducting coils 11, 12 winded and fixed on the ringed frames, and the ringed frames are fixed with the X-shaped fixed bracket 13. The frames 9, 10 are disposed respectively around the middle-ring 2 and symmetrically about the spoke bars 8. The inside of the frames completely disconnect with the middle-ring 2 so that the frames are turn-able to the middle-ring 2. That's the reason why the relative rotating device I is able to rotate relative to the stationary device II on the electric torsional vibration damper.

Conducting coil 11 is fixed on the frame 9 by binder, and conducting coil 12 is fixed on the frame 10 by binder. The structure makes two sides of the copper coils being located in the magnetic-field air-gaps which are formed by said magnets and middle-ring 2 and between them in ringed radial direction, and the winding direction of copper coil, which is also the direction of current, is perpendicular to that of magnetic field. Said frames are made from non-magnetic materials, such as copper, aluminum, or plastic.

To dispose the frame 10 around the middle-ring 2, the middle-ring 2 can be split at the spoke bars 8. First, put the frame 10 outside and around the middle-ring 2, then, fix the middle-ring 2 on the spoke bars 8 by bolts.

Except above components, other components of said damper include a fixed block 15, a spindle 16, rolling bearings 17, a brush 18, and spring retainers 19, 20.

On the X-shaped bracket 13, at least one space between two adjacent branches where no conducting coil is existed has a fixed block for limiting rotating range of the relative rotating device I to be disposed therein.

The fixed block 15 is fixed on the middle-ring 2 near the spoke bar 8 to limit the movement of frame and prevents the frame to impact the spoke bar 8 when overloaded.

Actually, spindle 16 is one part of the shaft system of the rotating machinery which needs vibration reduction. Rolling bearings 17 support the cored-ring 0 on the spindle 16 so that said relative rotating device I and the cored-ring 0 thereof can rotate relative to the shaft system.

The brush 18 is fixed on the spindle 16 to provide conducting coils 11, 12 with variable alternating current when the whole system rotates at high speed.

Said stationary device II, which includes frames 9, 10 and coils 11, 12, is fixed on the spindle 16 by the bracket 13 and rotates with the shaft system together.

The pair of springs 14 is symmetrically disposed outside the outer-ring. One end of each spiral spring is fixed on the outer-ring by spring retainer 19, the other end is fixed on the shaft system by spring retainer 20 or is directly fixed on the spindle by extended structure.

Thus, with the assistance of rolling bearings 17 and the action of the springs 14, said main relative rotating device I can oscillate about its steady-state relative to said stationary device II and the rotating shaft system served by it.

Key structures of said torsional vibration damper are further described.

The directions of air-gap magnetic-field created by said magnet and middle-ring 2 are radial, and the relation between two magnetic fields created by magnetic-field producing elements, which are oppositely disposed on two sides of said middle-ring 2, has two optional solutions:

The first one is that the magnetic fields producing by magnets, which are disposed oppositely on two sides, have opposite directions and repel each other, the second one is that the magnetic fields mentioned above have same directions and attract each other. Explanations are given respectively as follows:

First explain the first solution. The magnetic fields created by magnets 4, 6 and separated by middle-ring 2 repel each other (opposite direction), similarly, the other group of magnetic fields created by magnets 5, 7 repel each other as well (opposite direction). To increase the magnetic flux density of air-gap between middle-ring 2 and magnets on two sides, high-performance Neodymium-Iron-Boron (NdFeB) rare-earth permanent magnet is chosen as magnets and high-permeability soft magnetic material is chosen as middle-ring 2. The gaps between middle-ring 2 and magnets are small enough before contacting are made by either the inside of frame and middle-ring 2 or the outside of frame and magnets. When powering the copper coil around the frame outside the middle-ring 2, current directions of copper coils in the magnetic fields on two sides of the middle-ring 2 are opposite and the directions of the magnetic fields are opposite as well, that is, the currents of conducting coils 11, 12 in the magnetic field produced by magnet 4 are opposite to that in the magnetic field produced by magnet 6, and the magnetic-field direction of magnet 4 is opposite to that of the magnet 6 as well. Thus, according to Ampère's circuital law which describes the relation of magnetic flux density, electric current and Ampère's force, the forces which are applied by magnetic fields on conducting coils happen to be circumferential and in same direction, the amplitudes of the forces are direct proportional to current intensity, and the directions thereof vary with those of current.

As two sets of conducting coils 11, 12 are disposed with circular symmetry, the moving directions of electric current are controlled by connection between terminals of said two sets of copper coils so that peripheral forces created by those two sets of conducting coils 11, 12 in the magnetic field are appropriately equal in magnitude, opposite in direction and are both clockwise or counter-clockwise. Thus, a pure torsion of magnetic forces is formed whose value should be equal to the product obtained by multiplying the sum of peripheral forces created by one set of coil in the magnetic fields which are on its two sides by the diameter of midline on the middle-ring 2.

The pure torsion of magnetic field makes said relative rotating device I to rotate about the stationary device II and the shaft system, which results in the deformation of springs and then restoring forces are produced. The pair of springs are disposed symmetrically on the periphery, hence, the forces created by the pair of springs are equal in amount, opposite in direction, and both are clockwise or counter-clockwise, and thus, a pure torsion of restoring forces is formed.

Here briefly explain the second solution. The magnetic fields created by magnets 4, 6 and separated by middle-ring 2 are same in direction and attract each other, similarly, the other group of magnetic fields created by magnets 5, 7 are same in direction and attract each other as well. The current of coil in the magnetic field produced by magnet 4 (or by magnet 5) is opposite to that in the magnetic field produced by magnet 6 (or by magnet 7), hence, the peripheral forces created by conducting coils between two magnetic fields are opposite in direction, thus, the torsion created by each set of coil should be equal to the product of peripheral force on one side of the coil multiplied by the width of coils on two sides, and the total pure torsion of magnetic force is the sum of torsion created by two sets of coils.

Figure 4:
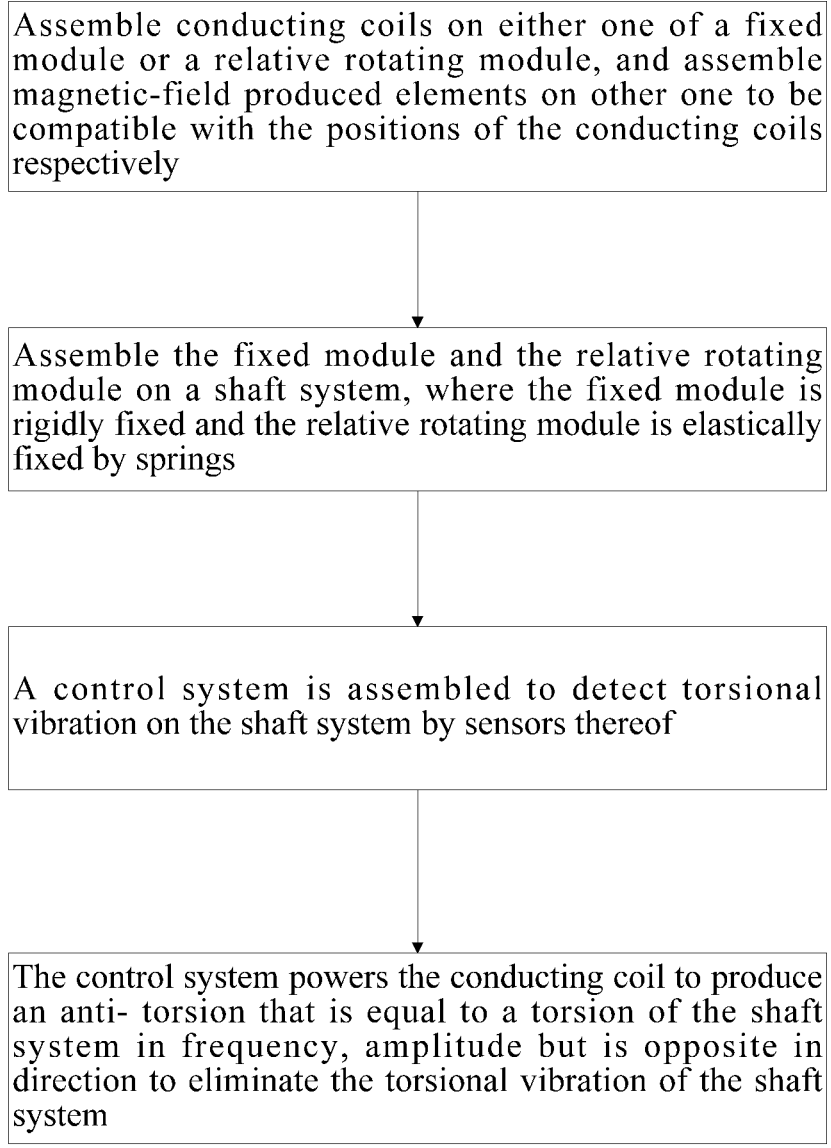
FIG. 4 is a flow chart of the method to assemble the active electric torsional vibration damper according to the present invention.

In addition, the present invention relates to a method to realize active electric torsional vibration damper. Referencing the above description and what has shown in FIG. 4, the method mainly comprises following steps:

Step 1, assemble conducting coils 11, 12 on a stationary device II, and assemble magnetic-field producing elements on a relative rotating device; Step 2, assemble the stationary device II and the relative rotating device I on rotating shaft system, where the stationary device II is rigidly fixed while the relative rotating device I is elastically fixed by springs;

Step 3, a control system is assembled to detect torsional vibration on the shaft system by sensors thereof;

Step 4, the control system power the conducting coil to produce an anti-torsion that is equal to a torsion of the shaft system in frequency, amplitude but is opposite in direction to eliminate the torsional vibration of the shaft system.

The sensor 30 is for detecting vibration on shaft system, for example, using vibration sensor, however, it can use any other sensor. Another example is adding torque sensor 30 on the shaft system, etc. The operating principle of said active electric torsional vibration damper is summarized with the embodiments:

The interaction between said conducting coils 11, 12 and magnets, which make the magnetic-field, produces pure torsion of magnetic force around said spindle 16, and the magnitude and direction of the torsion can be controlled by powered electric current. The variable torsion is applied on said relative rotating device I, which results in vibration and results another pure torsion around spindle 16 produced by said springs. According to Newton's principle on forces of action and reaction, above-mentioned torsion of magnetic force and torsion of spring force are also applied on above-mentioned stationary device II, and then transmitted to the shaft system of rotating machinery.

A control system 31 can real-time detect amplitudes, frequencies, and phases which are prominent and important in the torsional vibration on the shaft system of rotating machinery. Based on those, provide current signals which are same in frequency, corresponding in amplitude and phase, drive said torsional vibration damper to produce correspondent anti-torsion of magnetic force which are applied on the shaft system to generate anti-torsional vibration with same frequency and opposite amplitude, to eliminate original torsional vibration of the shaft system.

The magnitude of output torsion is determined by the magnitude of peripheral Ampère's force created by magnetic field on current-carrying coil and its distance from the axis of spindle 16; while Ampère's force is direct proportional to magnetic flux density, the length of current-carrying coil which is perpendicular to magnetic-field direction in the magnetic field and current intensity. On said apparatus, increasing the diameter of the circle on the damper will increase the arm of moment, and the arcs of magnet and frame can be increased, so, the length of coil winding is increased in the magnetic field; in addition, increasing the diameter of the damper can increase the thickness of the magnet, middle-ring 2 and frame, and increase the length of the frame in the magnetic field, and layers of coil; last, appropriate sectional size of copper coil can provide current with several Ampère without overheat. These features make it is possible to design different kinds of the damper from small size to large size to satisfy the market demand.

The detail description of the invention is for understanding present invention. However the scope of the invention will be decided by the claims.

What is claimed is:

1. An active electric torsional vibration damper comprising:
   a shaft rotatable about a longitudinal axis;
   a stator fixed on the shaft for joint rotation with the shaft, the stator having a X-shaped structure with four radially extending branches, a first arc conducting-coil frame having conducting coils extending between a first two adjacent branches, and a second arc conducting-coil frame having coils extending between a second two adjacent branches, which are circumferentially opposite the first two adjacent branches;
   a rotor rotatable relative to the stator and connected with the shaft by at least one a spring, the rotor comprising a cored ring, an inner ring, a middle ring, and an outer ring;
   a magnetic-field producing device comprising circumferentially aligned permanent magnets disposed on a radial outside of the inner ring and a radial inside of the outer ring respectively to create an annular magnetic field, said first and second conducting-coils are disposed radially between the inner ring and outer ring within the annular magnetic field, and the rotor is caused to rotate relative to the stator against a force of the at least one spring when the conducting-coils are powered by an electric current such that an anti-vibration torsion is produced by electromagnetic excitation;
   a sensor detecting torsional vibration and sending data of the detected torsional vibration to a control system;
   the control system powers the first and second conducting coils intensity of electric current according to the torsional vibration data from the sensor to cause the damper to produce an anti-torsion that is equal to a torsion of the shaft in frequency and amplitude but is opposite in direction to eliminate the torsional vibration of the shaft.

2. The active electric torsional vibration damper as claimed in claim 1, wherein a brush is disposed to power said conducting coils.

3. The active electric torsional vibration damper as claimed in claim 1, wherein the stator further comprises a stationary block disposed in a space between two adjacent branches where no conducting coil extends for limiting a rotational range of the relatively rotatable rotor.

4. The active electric torsional vibration damper as claimed in claim 1, wherein the relatively rotatable rotor is fixed on the shaft by two springs located symmetrically about the shaft.

5. The active electric torsional vibration damper as claimed in claim 1, wherein the permanent magnets of the magnetic-field producing device are composed of ringed neodymium iron boron magnets.

* * * * *